(12) United States Patent  
Markowski

(10) Patent No.: US 11,797,587 B2  
(45) Date of Patent: *Oct. 24, 2023

(54) SNIPPET GENERATION SYSTEM

(71) Applicant: SAP SE, Walldorf (DE)

(72) Inventor: Christoph Markowski, Ludwigsburg (DE)

(73) Assignee: SAP SE, Walldorf (DE)

(*) Notice: Subject to any disclaimer, the term of this patent is extended or adjusted under 35 U.S.C. 154(b) by 91 days.

This patent is subject to a terminal disclaimer.

(21) Appl. No.: 17/224,664

(22) Filed: Apr. 7, 2021

(65) Prior Publication Data

US 2021/0224304 A1  Jul. 22, 2021

Related U.S. Application Data

(63) Continuation of application No. 16/185,990, filed on Nov. 9, 2018, now Pat. No. 11,003,702.

(51) Int. Cl.
*G06F 16/33* (2019.01)
*G06F 16/93* (2019.01)
*G06F 16/9535* (2019.01)

(52) U.S. Cl.
CPC .......... *G06F 16/3347* (2019.01); *G06F 16/93* (2019.01); *G06F 16/9535* (2019.01)

(58) Field of Classification Search
CPC .... G06F 16/3347; G06F 16/345; G06F 16/93; G06F 16/95; G06F 16/9535
USPC ........................................................ 707/713
See application file for complete search history.

(56) References Cited

U.S. PATENT DOCUMENTS

| | | | |
|---|---|---|---|
| 6,784,354 B1* | 8/2004 | Lu | G10H 1/00 84/616 |
| 8,631,006 B1* | 1/2014 | Haveliwala | G06F 16/24578 707/723 |
| 2007/0016602 A1* | 1/2007 | McCool | G06F 16/335 707/999.102 |

(Continued)

FOREIGN PATENT DOCUMENTS

| | | | | |
|---|---|---|---|---|
| JP | 2010044584 A | * | 2/2010 | |
| JP | 2012003697 | * | 6/2010 | ............. G06F 17/30 |

OTHER PUBLICATIONS

"U.S. Appl. No. 16/185,990, Non Final Office Action dated Sep. 21, 2020", 17 pgs.

(Continued)

*Primary Examiner* — Syling Yen
(74) *Attorney, Agent, or Firm* — SCHWEGMAN LUNDBERG & WOESSNER, P.A.

(57) ABSTRACT

Systems and methods are provided for generating a rank vector comprising an array of values for each term position of a document and setting a value at a position of each term identifier in the document to a distance score for each term identifier, calculating snippet frame quality scores for each frame of a plurality of frames in the rank vector, determining whether a length of the character string associated with the frame with the highest frame quality score is similar to a requested length for a snippet, if necessary, adjusting the size of the character string to be similar to the requested length for the snippet and, once the length of a character string for one or more frames is similar to the requested length for the snippet, generating the character string to be provided as a snippet.

17 Claims, 6 Drawing Sheets

(56) References Cited

U.S. PATENT DOCUMENTS

| | | | |
|---|---|---|---|
| 2008/0109399 A1* | 5/2008 | Liao | G06F 16/345 |
| 2008/0154886 A1* | 6/2008 | Podowski | G06F 16/3325 |
| | | | 707/999.005 |
| 2009/0198667 A1 | 8/2009 | Groeneveld et al. | |
| 2009/0292683 A1* | 11/2009 | Kanungo | G06F 16/334 |
| | | | 707/999.005 |
| 2011/0302162 A1* | 12/2011 | Xiao | G06F 16/29 |
| | | | 707/E17.084 |
| 2014/0280088 A1 | 9/2014 | Speer et al. | |
| 2016/0078038 A1 | 3/2016 | Solanki et al. | |
| 2019/0079934 A1* | 3/2019 | Liao | G06F 16/248 |
| 2019/0205465 A1 | 7/2019 | Kulkarni | |
| 2020/0151263 A1 | 5/2020 | Markowski | |

OTHER PUBLICATIONS

"U.S. Appl. No. 16/185,990, Notice of Allowance dated Jan. 22, 2021", 7 pgs.

"U.S. Appl. No. 16/185,990, Response filed Nov. 23, 2020 to Non Final Office Action dated Sep. 21, 2020", 15 pgs.

* cited by examiner

SNIPPET GENERATION SYSTEM

CROSS-REFERENCE TO RELATED APPLICATIONS

This application is a continuation of prior application Ser. No. 16/185,990, filed on Nov. 9, 2018, which is incorporated by reference herein in its entirety.

BACKGROUND

Search engines (e.g., Google, Yahoo, SAP Enterprise Search) provide the ability to search both structured and unstructured information in a data store. As data continues to grow in a company or across the Internet, it is increasingly important to provide useful results in response to a user search request, particularly when dealing with data in an unstructured format.

BRIEF DESCRIPTION OF THE DRAWINGS

Various ones of the appended drawings merely illustrate example embodiments of the present disclosure and should not be considered as limiting its scope.

FIG. 4 illustrates example frames in a rank vector, according to some example embodiments.

DETAILED DESCRIPTION

Figure 1:
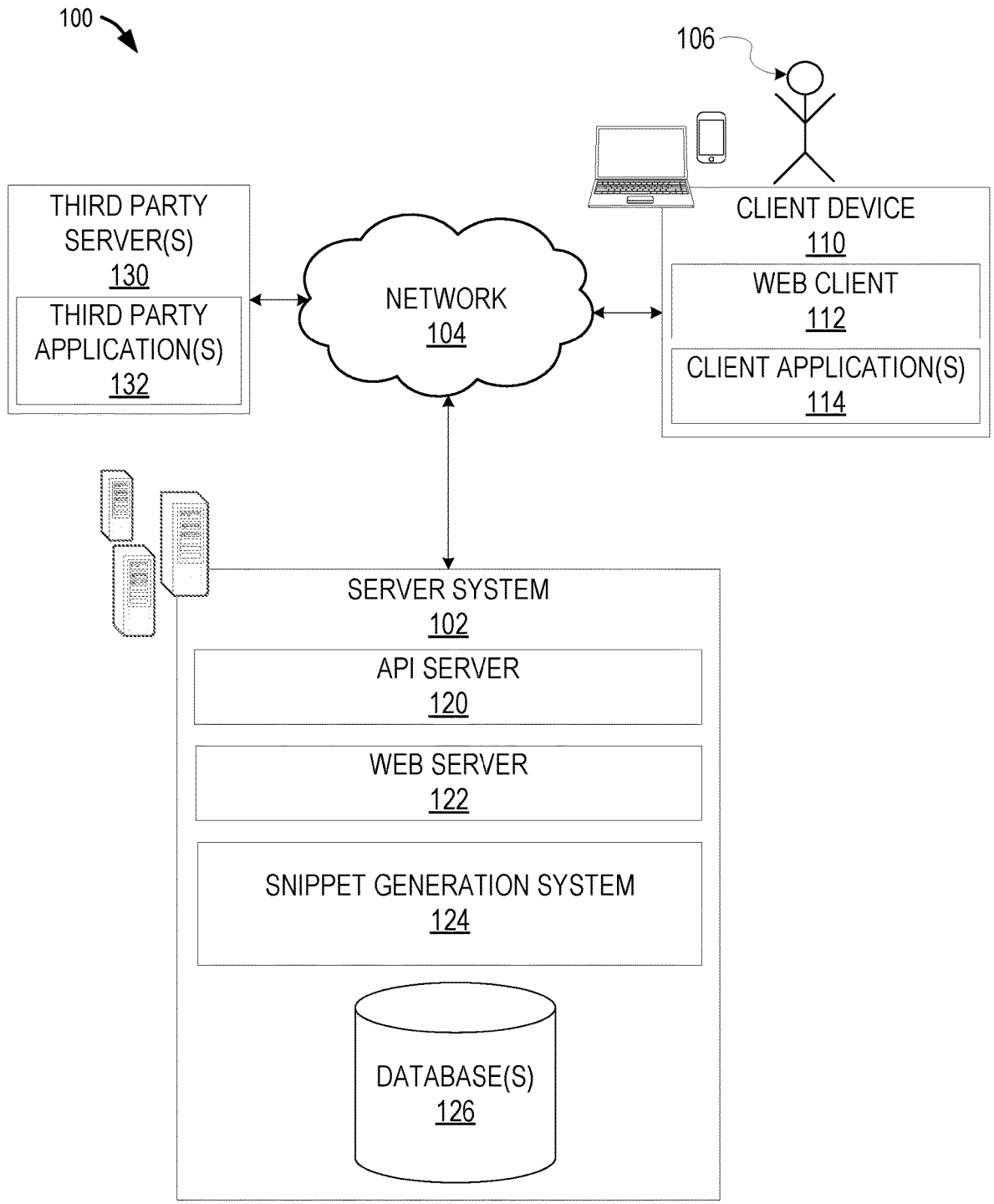
FIG. 1 is a block diagram illustrating a networked system, according to some example embodiments.

Systems and methods described herein relate to snippet generation. As mentioned above, search engines provide the ability to search both structured and unstructured information in a data store. As data continues to grow in a company or across the Internet, it is increasingly important to provide useful results in response to a user search request, particularly when dealing with data in an unstructured format. In particular, simply returning a large list of results to a user in response to a search input is not very useful. Accordingly, while one goal of a search engine is to provide the best matches to the user based on the user input, it is also important to provide a short snippet for each one or more result (e.g., the most relevant result, the top predetermined number of most relevant results, all of the results). A snippet is a small piece or brief extract from the document in the result. For example, a user may input "best beaches in Jamaica" and the results of a search for this input may result in a number of documents discussing the best beaches in Jamaica. One of the documents may be a twenty-page document. A snippet of the twenty-page document may include a few words or lines with the most relevant part of the twenty-page document (e.g., with a list of the top beaches in Jamaica, or with a description of one of the top beaches). A snippet helps a user recognize the content without having to click on the result to open the document, open the website, download a file, or read the whole text of the document.

Moreover, different computing devices have different display sizes and requirements. For example, a mobile device (e.g., smart phone or tablet) may have a smaller display area while a workstation with an external monitor may have a large display space. Thus, while using a workstation with an external display may have enough space for a long snippet, using a mobile phone may have limited space. Also, search engines are used internationally in numerous different languages and data also comprises documents in numerous different languages.

The more data available and relevant to a user query, the more important it is to generate a useful snippet. Example embodiments provide a system for generating snippets that allows for a variable length/size of a snippet (e.g., to account for various computing device display sizes and requirements) and for showing the best possible part of the text in the document (e.g., the most relevant to the user input). Moreover, example embodiments are language independent.

For example, a computing device accesses a document result for a search input, the document result comprising a list of term identifiers associated with a document for each term in the search input, a distance score for each term identifier, and one or more positions in the document for each term identifier, and generates a rank vector comprising an array of values for each term position of the document and setting a value at a position of each term identifier in the document to the distance score for each term identifier. The computing device calculates snippet frame quality scores for each frame of a plurality of frames in the rank vector, each frame comprising a predetermined number of consecutive positions in the rank vector corresponding to a snippet frame size and ranks the plurality of frames in the rank vector by the snippet frame quality scores. The computing device determines whether a length of the character string associated with the highest ranked frame is similar to a requested length for a snippet. Based on determining that the length of the character string associated with the highest rank frame is larger than the requested length for a snippet, the computing system adjusts the size of the character string to be similar to the requested length for the snippet. Based on determining that the length of the character string associated with the highest rank frame is smaller than the requested length for a snippet, the computing system adjusts the size of the character string to be similar to the requested length for the snippet. Once the length of a character string for one or more frames is similar to the requested length for the snippet, the computing system generates the character string to be provided in a result of a search for the search input.

Calculating and utilizing a quality score to rank the frames in a rank vector provide the benefit of generating a more relevant or higher quality snippet instead of just returning the first hit in the document. This is particularly beneficial when there is a small display size that may only allow for a short snippet. If only the first hit is provided versus the most relevant one, the snippet may not be very useful. In one example, the terms from the user input (or that are relevant/similar to the user input) are highlighted within the snippet (e.g., the snippet may contain <b> bold tags).

FIG. 1 is a block diagram illustrating a networked system 100 configured to generate snippets, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to access and utilize cloud services, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an analytics design application, and the like.

In some embodiments, one or more client applications 114 may be included in a given one of the client device 110, and configured to locally provide the user interface and at least some of the functionalities, with the client application 114 configured to communicate with other entities in the system 100 (e.g., third-party servers 130, server system 102, etc.), on an as-needed basis, for data and/or processing capabilities not locally available (e.g., access location information, access software version information, access an ERP system, access a CRM system, access an analytics design system, access data to respond to a search query, to authenticate a user 106, to verify a method of payment, etc.). Conversely, one or more applications 114 may not be included in the client device 110, and then the client device 110 may use its web browser to access the one or more applications hosted on other entities in the system 100 (e.g., third-party servers 130, server system 102, etc.).

A server system 102 may provide server-side functionality via the network 104 (e.g., the Internet or wide area network (WAN)) to one or more third-party servers 130 and/or one or more client devices 110. The server system 102 may include an application program interface (API) server 120, a web server 122, and snippet generation system 124 that may be communicatively coupled with one or more databases 126.

The one or more databases 126 may be storage devices that store data related to users of the system 100, applications associated with the system 100, cloud services, and so forth. The one or more databases 126 may further store information related to third-party servers 130, third-party applications 132, client devices 110, client applications 114, users 106, and so forth. In one example, the one or more databases 126 may be cloud-based storage.

The server system 102 may be a cloud computing environment, according to some example embodiments. The server system 102, and any servers associated with the server system 102, may be associated with a cloud-based application, in one example embodiment.

The snippet generation system 124 may provide back-end support for third-party applications 132 and client applications 114, which may include cloud-based applications. The snippet generation system 124 processes requests for snippets, generates snippets, and so forth, as described in further detail below. The snippet generation system 124 may comprise one or more servers or other computing devices or systems.

The system 100 may further include one or more third-party servers 130. The one or more third-party servers 130 may include one or more third-party application(s) 132. The one or more third-party application(s) 132, executing on third-party server(s) 130, may interact with the server system 102 via API server 120 via a programmatic interface provided by the API server 120. For example, one or more the third-party applications 132 may request and utilize information from the server system 102 via the API server 120 to support one or more features or functions on a website hosted by the third party or an application hosted by the third party. The third-party website or application 132, for example, may provide analytics design and viewing functionality that is supported by relevant functionality and data in the server system 102.

Data is typically stored in a database or other data store in a way to allow for fast text search of the data (e.g., of documents stored in the database or other data store). For example, each document in the database can be tokenized and optionally standardized to generate an inverted index. The inverted index contains each unique term from all the documents in the database and the documents in which they appear. Additionally, each term may have an associated term identifier (ID).

For example, a first document (e.g., Doc1) may comprise the following content:

Jamaica is a Commonwealth realm, with Queen Elizabeth II as its monarch and head of state. Her appointed representative in the country is the Governor-General of Jamaica, an office held by Sir Patrick Allen since 2009. Andrew Holness has served as the head of government and Prime Minister of Jamaica from March 2016. Jamaica is a parliamentary constitutional monarchy with legislative power vested in the bicameral Parliament of Jamaica, consisting of an appointed Senate and a directly elected House of Representatives.

And a dictionary for the inverted index for terms in the above document may comprise:

| Term ID | Term |
|---|---|
| 1 | jamaica |
| 2 | is |
| 3 | a |
| 4 | commonwealth |
| 5 | realm |
| 6 | with |
| 7 | queen |
| 8 | elizabeth |
| 9 | ii |
| 10 | as |
| 11 | its |
| 12 | Monarch |
| ... | |

Note that the term IDs may not be ordered, the above table just shows an example. In addition, the whole document is represented as a list of term IDs. For example, Doc1 as an array of term IDs may look like: [1, 2, 3, 4, 5, 6, 7, . . . , 1, . . . ,]. Term IDs might occur multiple times in this array in the same way (e.g., location/placement) as the terms occur in the document. For example, Jamaica is the first word in Doc1 and has a term ID of 1. Thus, a 1 appears in the first location in the array to indicate that a word with term ID 1 is the first word in the document.

To be able to search this document (Doc1) or any other document, a search input (e.g., "jamaika monarch") needs to be tokenized in the same way as the documents in the dictionary. This can be language dependent or language independent. For example, languages without separators (e.g., spaces), such as Chinese, may need language dependent tokenization.

In one example, the search in the dictionary for terms from the search input may be done using a fault tolerant algorithm and/or other algorithm(s) to find matching terms in the dictionary. Example fault tolerant algorithms include Levenshtein distance and N-gram.

The below table shows a result for a search in Doc1 for each term from the search input "jamaika monarch" using a fault tolerant algorithm.

| jamaika | | | monarch | | |
|---|---|---|---|---|---|
| Term IDs | Distance/Rank | Positions | Term IDs | Distance/Rank | Positions |
| 1 | 0.87 | [0, 27, 50, 54, 69] | 12 | 1 | [11] |
| | | | 46 | 0.95 | [59] |
| | | | 42 | 0.73 | [52] |

The Distance/Rank (also referred to herein as "distance score") refers to how close (e.g., similar) the search input term (e.g., "jamaika" or "monarch") is to the term in the document associated with the term ID. In this example, the distance is a value between 0 and 1 where 1 means an exact match (e.g., the terms are identical). In this example, the term IDs indicate the following terms: 1=jamaica, 12=monarch, 46=monarchy, and 42=march. Thus, the search input term "jamaika," the term with term ID 1 (e.g., jamaica), has a Distance/Rank of 0.87 and is in the following positions in the document: 0, 27, 50, 54, and 69. For the search input term "monarch" there are three relevant term IDs: 12, 46, and 42. For example, the term ID 12 ("monarch") is an exact match to the search input term "monarch" and thus, has a Distance/Rank of 1. The term with term ID 12 is in position 11 in the document. In this example, the positions start with position 0 (e.g., the first word in the document is at position 0).

The matched term IDs, their distance/rank, and their positions are relevant for generating a snippet, according to example embodiments. This information can be used to calculate the best frames for a snippet, as described below. Because example embodiments utilize term IDs and distances/ranks, example embodiments are completely independent of the given language of the document. The original terms for each term ID should be available to generate/concatenate a snippet string, of course, but the original terms are not necessary to find the best snippet candidate frames.

Figure 2:
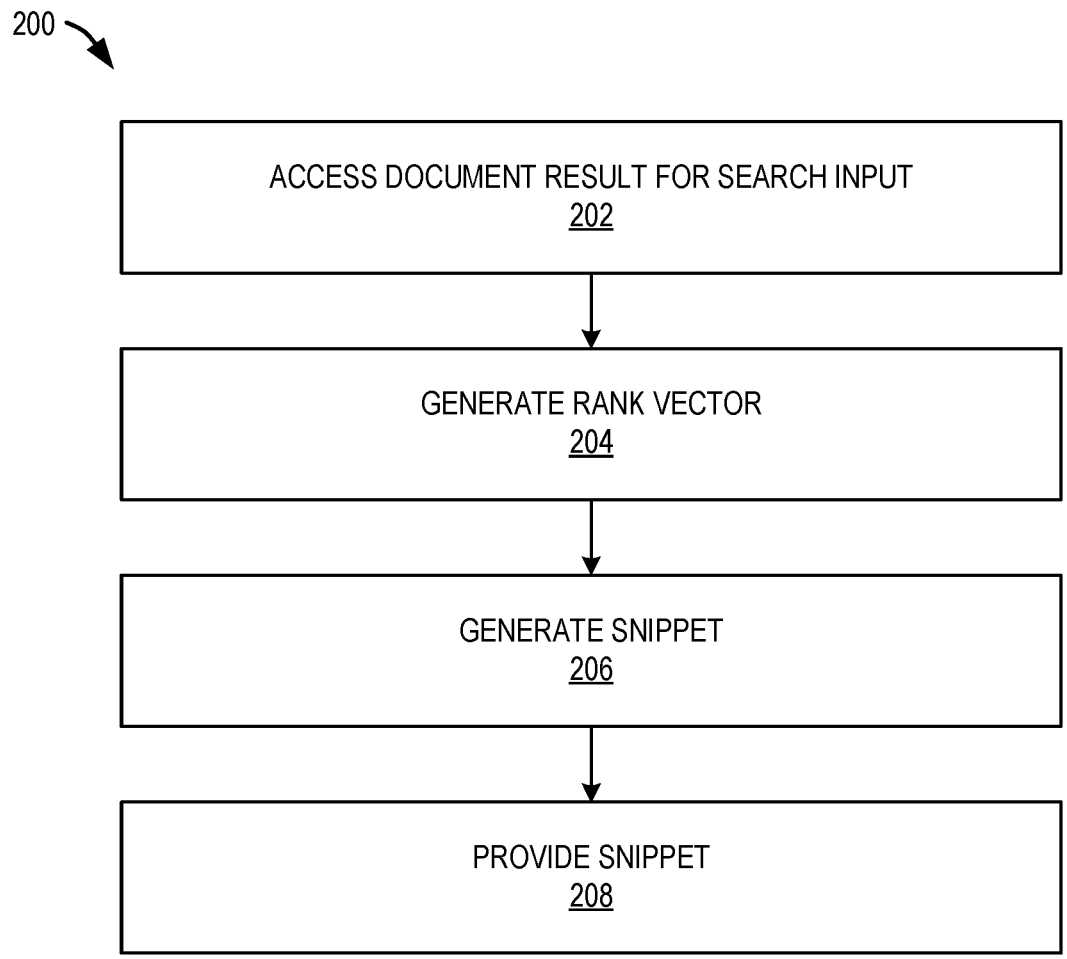
FIGS. 2-3 are flowcharts illustrating aspects of a method, according to some example embodiments.

FIG. 2 is a flow chart illustrating aspects of a method 200 for generating a snippet, according to some example embodiments. For illustrative purposes, method 200 is described with respect to the networked system 100 of FIG. 1. It is to be understood that method 200 may be practiced with other system configurations in other embodiments.

In operation 202, the computing system (e.g., server system 102 or snippet generation system 124) accesses a document result for a search input. In one example, a document result for a search input comprises a list of term identifiers associated with a document for each term in the search input, a distance score for each term identifier, and one or more positions in the document for each term identifier. The table described above with term IDs, Distance/Rank, and positions for the search input comprising "jamaika" and "monarch" is an example of a document result for Doc1 for search input "jamaika monarch."

In one example, the computing system may access the document result in response to a request for one or more snippets for one or more documents in a search result associated with the search input. The request may be received from another system or application (e.g., third-party server 130, third-party application 132) or from an application or system within the same system as the computing system (e.g., within server system 102 or snippet generation system 124).

In one example, the request includes a requested snippet size (e.g., length for a snippet such as a number of words or characters) for one or more documents in a search result associated with a search input. In another example, the request includes a display size or device or display information (e.g., font size, resolution, device type, etc.) and the computing system determines an optimal snippet size based on the display size or other information. In one example the snippet size is variable and can be dynamically adjusted to the display size. A user-defined value for the snippet size can also be used in some example embodiments. In one example, access to or the document result itself is provided to the computing system (e.g., from another system/application within the same system as the computing system or from another system/application).

In operation 204, the computing system generates a rank vector comprising an array of values for each term position of the document. The computing device sets a value at a position of each term identifier in the document to the distance score for each term identifier. For example, as explained above, Doc1 is represented by an array of term IDs. For each "hit" in the document (e.g., each term in the document associated with the search input), the computing system inserts the distance score (also referred herein as "Distance/Rank") at the hit position (e.g., at the position where the term appears in the document). An example rank vector of Doc1 and Search1 ("jamaika monarch") is as follows: [0.877655, 0, 0, 0, 0, 0, 0, 0, 0, 0, 0, 1, 0, 0, 0, 0, 0, 0, 0, 0, 0, 0, 0, 0, 0, 0, 0, 0.877655, 0, 0, 0, 0, 0, 0, 0, 0, 0, 0, 0, 0, 0, 0, 0, 0, 0, 0, 0, 0, 0.877655, 0, 0.739487, 0, 0.877655, 0, 0, 0, 0, 0.952698, 0, 0, 0, 0, 0, 0, 0, 0, 0.877655, 0, 0, 0, 0, 0, 0, 0, 0, 0, 0, 0]

The above rank vector comprises a value for each term in the document in the order the terms appear in the document. As can be seen in the above rank vector, for each place or position in the document indicated by the array, a distance score is inserted as the value in that position for the terms associated with the search input (e.g., relevant terms). The positions that do not contain a term associated with the search input each contain a value of 0 to indicate that those positions do not contain a term associated with the search input. The distance scores in the above example rank vector were generated using an n-gram based algorithm.

For example, the computing system goes through each term ID in the document result. Using the "jamaika monarch" example, the computing device would first analyze term ID 1 and see which positions term ID 1 appears in the document (e.g., 0, 27, 50, 54, and 69). The computing device would then insert the distance score for term ID 1 (e.g., 0.877655 or 0.87) in position 0, 27, 50, 54, and 69 of the rank vector. The computing device would do the same for each term ID and each position each term ID appears in the document.

Figure 3:
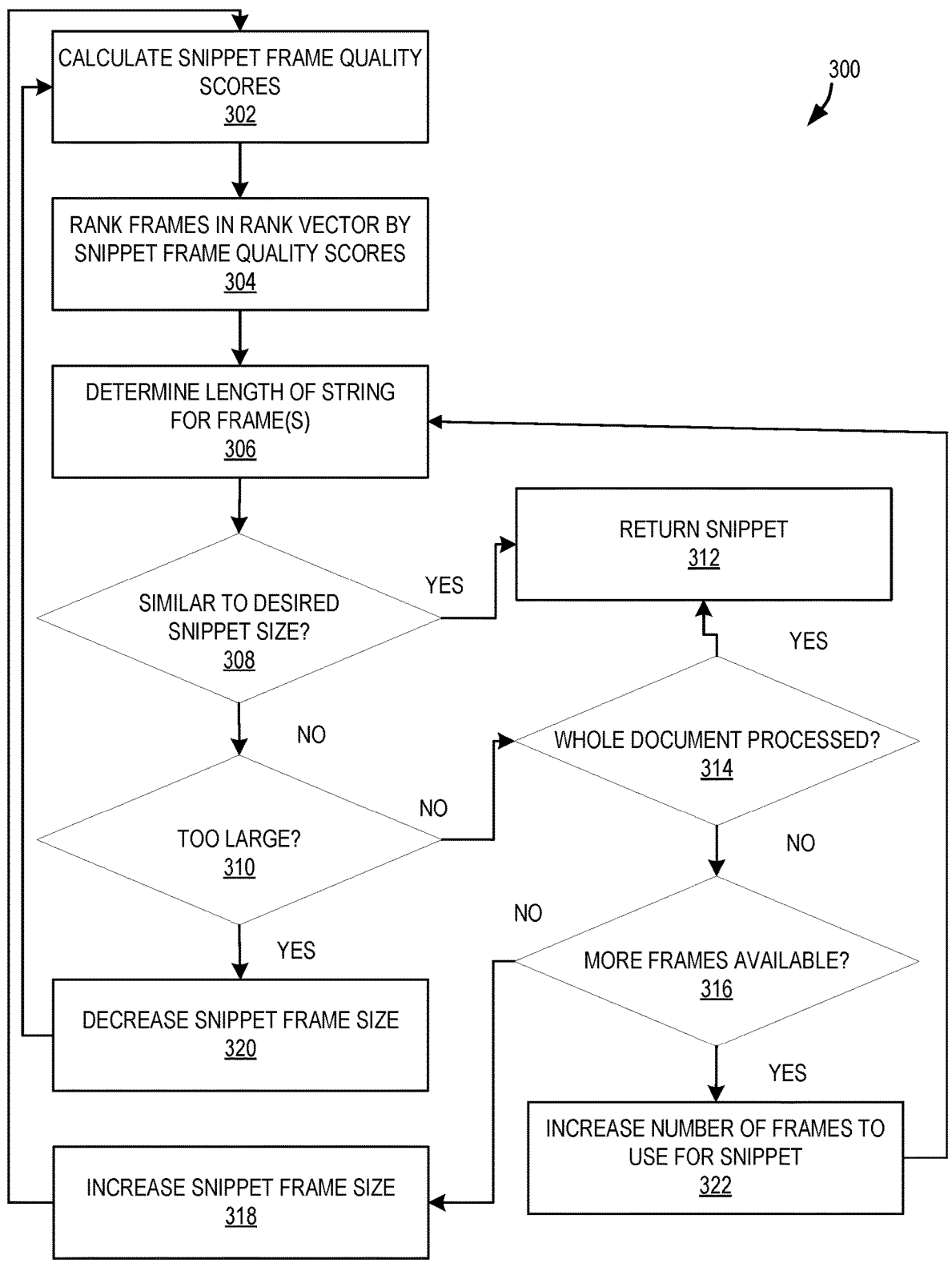

In operation 206, the computing system generates a snippet from the document. FIG. 3 is a flowchart illustrating aspects of a method 300 for generating a snippet, according to some example embodiments. For illustrative purposes, method 300 is described with respect to the networked system 100 of FIG. 1. It is to be understood that method 300 may be practiced with other system configurations in other embodiments.

In operation 302, the computing system calculates snippet frame quality scores for each frame of a plurality of frames in the rank vector. In one example, a frame or sliding window with a predetermined (and variable) size is used to go through a given rank vector to calculate a frame quality score for each frame. A snippet frame size may be a predetermined size (e.g., 12 terms or words) and may be adjusted to generate the appropriately sized snippet, as explained in further detail below. In one example, the snippet frame size is set to 12 (e.g., 12 terms or words in a snippet) because this may be determined to be the minimum display that would still comprise useful information/context in the snippet. It should be understood than any predetermined snippet frame size may be used and the snippet frame size 12 is just an example.

Figure 4:
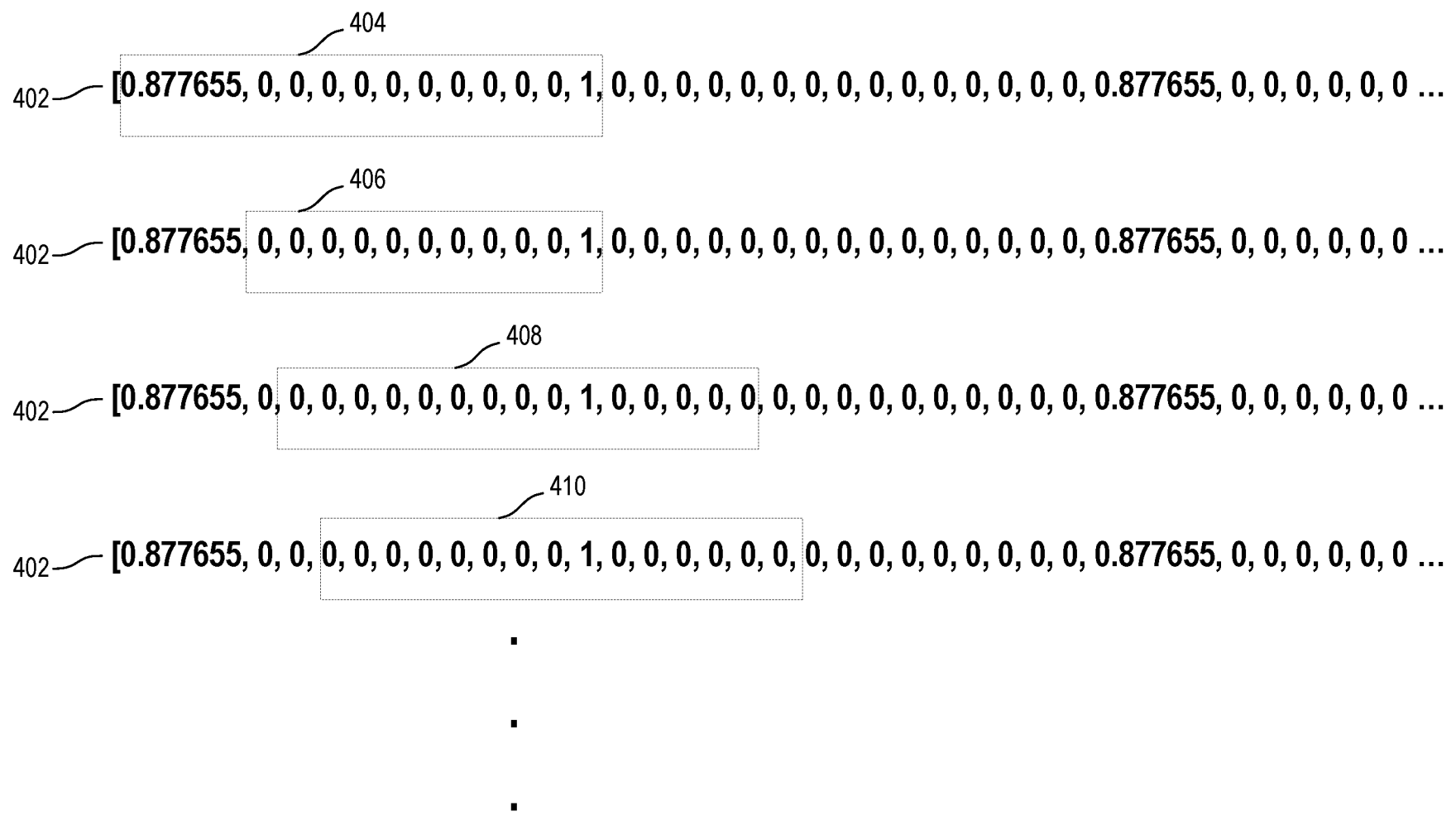

In one example, each frame comprises a predetermined number of consecutive positions in a rank vector corresponding to a snippet frame size. The computing device determines the snippet frame size to use for calculating the snippet frame quality scores. FIG. 4 illustrates example frames in a rank vector 402 for Doc1. In this example, the snippet frame size is 12. For example, a first frame 404 starts a beginning first position of the rank vector 402 (e.g., position 0), a second frame 406 starts at a second position of the rank vector 402 (e.g., position 1), a third frame 408 starts at the third position of the rank vector 402 (e.g., position 2), a fourth frame 410 starts at the fourth position of the rank vector 402 (e.g., position 3), and so forth until the end of the document is reached. In this way, the computing system can use the frame as a sliding window to go through the given rank vector (e.g., array) to calculate a snippet frame quality score for each frame of a plurality of frames in the rank vector.

In one example, the computing system calculates the snippet frame quality score for a given frame by adding up the distance scores in the given frame. For example, the computing device would start at a beginning first position (e.g., 0) of the rank vector 402 and determine a first frame (e.g., 404) of a size equal to the snippet frame size (e.g., 12) and calculate a snippet frame quality score for the first frame using the distance score values of the first frame. For instance, in the example first frame 404, the snippet frame quality score for the first frame is 1.877655 (e.g., 0.877655+ 1). The computing system would then move to the next consecutive position (e.g., position 1) and determine the second frame of a size equal to the snippet frame size and calculate the snippet frame quality score for the next frame using the distance score values in the second frame. For example, in the example second frame 406, the snippet frame quality score for the second frame is 1. The computing system continues to move to each next consecutive position to calculate a snippet frame quality score for each frame until the end of the array is reached.

The computing system can then rank the plurality of frames in the rank vector 402 by the snippet quality frame scores, as shown in operation 304 of FIG. 3. For example, the computing system can rank the plurality of frames from highest ranked frame to lowest ranked frame. An example of top ranked frames for Doc1 may look as follows:

pos: 48 rank: 3.44749→3 term(s) matched
pos: 0 rank: 1.87765→2 term(s) matched
pos: 53 rank: 1.83035→2 term(s) matched
pos: 41 rank: 1.61714→2 term(s) matched
pos: 1 rank: 1→1 term(s) matched
pos: 55 rank: 0.952698→1 term(s) matched
pos: 60 rank: 0.877655→1 term(s) matched The computing system may then start with the highest ranked frame to generate a candidate snippet. In operation 306, the computing device determines a length of a string associated with the frame(s). For example, the computing system determines a length of a character string for the highest ranked frame. To do this, the computing system accesses the original terms in the document to calculate the number of characters in the string for that frame. Using Doc1 as the example document and the frame at position 48 as the highest ranked frame, the computing device would calculate a length of 88 for the character string for the frame comprising the terms "Minister of Jamaica from March 2016. Jamaica is a parliamentary constitutional monarchy." In one example, a snippet may include predefined characters before and after a particular frame (e.g., a space and three dots) and so these additional characters would also be taken into account for the length of the character string. For example, if a space and three dots are used at the beginning and end of the terms in the frame, the computing device would calculate a character string length of 95 for the above example.

In operation 308, the computing system determines whether the length of the character string associated with the highest ranked frame (or given frame(s)) is similar to a requested or desired length for a snippet. For example, the computing device may determine that a length of a character string is similar to a desired length for a snippet based on a predetermined threshold. For example, the predetermined threshold may be 15% or 20%. Thus, if the desired snippet size is 100 characters, the above example frame (e.g., of character string length 88 or 95) would be similar since it is within 15% or 20% of the desired length. If the desired snippet size is 25, however, the above example frame would be too large, and if the desired snippet size is 180, the above example frame would be too small.

If the computing device determines that the length of the character string associated with the given frame is similar to the desired snippet size, the computing device can generate the snippet from the terms in the document (e.g., "Minister of Jamaica from March 2016. Jamaica is a parliamentary constitutional monarchy.") and return the snippet to the application or system requesting the snippet at operation 312, as explained in further detail below.

If the computing system determines that the length of the character string associated with the given frame is not similar to the desired snippet size, the computing device determines whether it is too large at operation 310. If the length of the characters string associated with the given frame is not too large (no), then the length of the character string is too small. The computing device determines whether or not the whole document has been processed, in operation 314. If the whole document has been processed (e.g., there is only one frame or all of the available frames are incorporated into the candidate snippet (e.g., character string)), then the computing system returns the snippet to the application or system requesting the snippet at operation 312 even though it is too small since there are no further terms to add from the document.

If the computing system determines the whole document has not been processed (no at operation 314) then the computing system adjusts the size of the character string to be similar to the requested length for the snippet (e.g., increases the size of character string for the candidate snippet so that it is similar to the requested length for the snippet). In one example, the computing device can increase the size of the character string by adding more frames (if available) or by increasing the snippet frame size and reprocessing the rank vector using the increased snippet frame size. In another example, the computing device can increase the size of the character string by adding additional terms from the left and/or right of the chosen frame until the character string is a similar size to the desired length (e.g., in the case where just a few more characters would get the character string to the desired length).

In operation 316, the computing device determines whether there are more frames available that are not yet included in the candidate snippet. If there are more frames available (yes), the computing device can adjust the size of the character string by increasing the size of the character string by adding one or more next ranked frames to the snippet until a length of a character string associated with the highest ranked frame and the one or more next ranked frames is similar to the requested length for the snippet. For example, in operation 322, the computing device increases the number of frames to use for the snippet. For example, the computing device will include the terms associated with the next ranked frame and then return to operation 306 to determine the length of the character string for the two (or more) frames and continue the operations from there until a length of a character string associated with the highest ranked frame is similar to the requested length for the snippet.

If there are no more frames available (no in operation 316), the computing device increases the snippet frame size in operation 318 (e.g., from 12 to 18). In one example, the optimal length can be identified in a binary search. For example:
Run the first retry with the half size of the initial snippetFrameSize(snippetFrameSize=snippetFrameSize/2). And if the result was too short, run the next retry with snippetFrameSize+=snippetFrameSize/2, and so on.

For instance, if the starting snippetFrameSize is 12 and the candidate snippet is too long, the computing device can take half of 12 and continue with a snippetFrameSize of 6. If the result using snippetFrameSize of 6 is too short, the computing device can add half of 6 to 6 and continue with a snippetFrameSize 9. This can continue until the desired length is reached.

The computing device then returns to operation 302 to recalculate the snippet frame quality scores for each frame of a plurality of frames in the rank vector based on the updated/increased snippet frame size and proceed with the rest of the operations until a length of a character string associated with the highest ranked frame is similar to the requested length for the snippet.

If the computing system determines that the length of the character string associated with the highest rank frame is larger than the requested length for a snippet (yes in operation 310), the computing device will need to adjust the size of the character string (e.g., decrease) to be similar to the requested length for the snippet. In one example, the computing system adjusts the size of the character string to be similar to the requested length for the snippet by removing unnecessary terms at the beginning and end of the character string. For example, the computing device may determine that there are unmatched terms at the beginning and/or end of the frame (e.g., terms that are not relevant/similar to any search input terms) and remove the amount necessary (terms or characters) to reach a similar length as the desired length. In another example, the computing system adjusts the size of the character string to be similar to the requested length for the snippet by decreasing the snippet frame size, in operation 320, and then returns to operation 302 to recalculate the snippet frame quality scores for each frame of a plurality of frames in the rank vector until a length of a character string for a candidate snippet is similar to the requested length for the snippet.

Once the character string for a candidate snippet is a similar length as the requested length for the snippet, the computing device generates the snippet from the candidate snippet and returns the snippet in operation 312. The snippet is provided to a requesting application or computing device system, as shown in operation 208 of FIG. 2.

To generate the snippet, in one example the computing device adds predetermined characters at the beginning and end of each character string from each frame, as described above. In one example, the computing device adds bold tags to indicate that the relevant terms (e.g., terms that are relevant or similar to the terms in the search input) should appear in bold in a display of the snippet. For example, the computing device may return the following generated snippet (95 characters without bold tags, created from one frame) for a snippet size of 100: . . . Minister of <b>Jamaica</b> from <b>March</b> 2016. <b>Jamaica</b> is a parliamentary constitutional <b>monarchy</b> . . . .

And the computing device may return the following generated snippet (168 characters without bold tags, created from two frame) for a snippet size of 180: <b>Jamaica</b> is a Commonwealth realm, with Queen Elizabeth II as its <b>monarch</b> . . . Minister of <b>Jamaica</b> from <b>March</b> 2016. <b>Jamaica</b> is a parliamentary constitutional <b>monarchy</b> . . . .

When generating the snippet, the computing device may adjust the frame(s) in a way such that the matched terms are centered, if possible (e.g., by moving the frame to the left or right or adding additional terms from the left and/or right of the frame). If using more than one frame, in one example, the computing device returns the snippet with the characters strings for each frame in the order it appears in the document (e.g., versus the order it was ranked).

The following examples describe various embodiments of methods, machine-readable media, and systems (e.g., machines, devices, or other apparatus) discussed herein.

Example 1. A computer-implemented method comprising:
  accessing, using a computing system, a document result for a search input, the document result comprising a list of term identifiers associated with a document for each term in the search input, a distance score for each term identifier, and one or more positions in the document for each term identifier;
  generating, using the computing system, a rank vector comprising an array of values for each term position of the document and setting a value at a position of each term identifier in the document to the distance score for each term identifier;
  calculating, using the computing system, snippet frame quality scores for each frame of a plurality of frames in the rank vector, each frame comprising a predetermined number of consecutive positions in the rank vector corresponding to a snippet frame size;
  ranking, using the computing system, the plurality of frames in the rank vector by the snippet frame quality scores;
  determining, using the computing system, a length of a character string associated with the highest ranked frame;
  determining, using the computing system, whether the length of the character string associated with the highest ranked frame is similar to a requested length for a snippet;
  based on determining that the length of the character string associated with the highest ranked frame is larger than the requested length for a snippet, adjusting the size of the character string to be similar to the requested length for the snippet;
  based on determining that the length of the character string associated with the highest ranked frame is smaller than the requested length for a snippet, adjusting the size of the character string to be similar to the requested length for the snippet; and
  based on determining that the length of a character string for one or more frames is similar to the requested length for the snippet, generating, by the computing system, the character string to be provided in a result of a search for the search input.

Example 2. A method according to any of the previous examples, wherein positions in the array of values that do not comprise a term identifier are each set with a predetermined value indicating that there is no relevant term identifier for that position.

Example 3. A method according to any of the previous examples, wherein setting the value at the position of each term identifier in the document to the distance score for each term identifier comprises inserting the distance score for each term identifier in the array at the position of the term in the document.

Example 4. A method according to any of the previous examples, wherein before calculating the snippet frame quality scores for each frame of the plurality of frames in the rank vector, the computing system determines a snippet frame size to use for calculating the snippet frame quality scores.

Example 5. A method according to any of the previous examples, wherein calculating the snippet frame quality scores for each frame of the plurality of frames in the rank vector comprises:
  starting at a beginning first position of the array and determining a first frame of a size equal to the snippet frame size;
  calculating a snippet frame quality score for the first frame using the values in the first frame;
  moving to the next consecutive position in the array;
  determining a next frame of a size equal to the snippet frame size;
  calculating a snippet frame quality score for the next frame using the values in the next frame;
  continuing to move to a next consecutive position in the array; and
  calculating a snippet frame quality score for each frame until the end of the array is reached.

Example 6. A method according to any of the previous examples, wherein based on determining that the length of the character string associated with the highest ranked frame is larger than the requested length for a snippet, adjusting the size of the character string to be similar to the requested length for the snippet comprises removing unnecessary terms at the beginning and end of the character string.

Example 7. A method according to any of the previous examples, wherein based on determining that the length of the character string associated with the highest ranked frame is larger than the requested length for a snippet, adjusting the size of the character string to be similar to the requested length for the snippet comprises:
  decreasing the snippet frame size and recalculating the snippet frame quality scores for each frame of a plurality of frames in the rank vector until a length of a character string associated with the highest ranked frame is similar to the requested length for the snippet.

Example 8. A method according to any of the previous examples, wherein based on determining that the length of the character string associated with the highest ranked frame is smaller than the requested length for a snippet, adjusting the size of the character string to be similar to the requested length for the snippet comprises:
  increasing the size of the character string by adding one or more next ranked frame to the snippet until a length of a character string associated with the highest ranked frame and the one or more next ranked frames is similar to the requested length for the snippet.

Example 9. A method according to any of the previous examples, wherein based on determining that the length of the character string associated with the highest ranked frame is smaller than the requested length for a snippet, adjusting the size of the character string to be similar to the requested length for the snippet comprises:
  increasing the snippet frame size and recalculating the snippet frame quality scores for each frame of a plurality of frames in the rank vector until a length of a character string associated with the highest ranked frame is similar to the requested length for the snippet.

Example 10. A system comprising:
  a memory that stores instructions; and
  one or more processors configured by the instructions to perform operations comprising:
    accessing a document result for a search input, the document result comprising a list of term identifiers associated with a document for each term in the search input, a distance score for each term identifier, and one or more positions in the document for each term identifier;

generating a rank vector comprising an array of values for each term position of the document and setting a value at a position of each term identifier in the document to the distance score for each term identifier;

calculating snippet frame quality scores for each frame of a plurality of frames in the rank vector, each frame comprising a predetermined number of consecutive positions in the rank vector corresponding to a snippet frame size;

ranking the plurality of frames in the rank vector by the snippet frame quality scores;

determining a length of a character string associated with the highest ranked frame;

determining whether the length of the character string associated with the highest ranked frame is similar to a requested length for a snippet;

based on determining that the length of the character string associated with the highest ranked frame is larger than the requested length for a snippet, adjusting the size of the character string to be similar to the requested length for the snippet;

based on determining that the length of the character string associated with the highest ranked frame is smaller than the requested length for a snippet, adjusting the size of the character string to be similar to the requested length for the snippet; and based on determining that the length of a character string for one or more frames is similar to the requested length for the snippet, generating the character string to be provided in a result of a search for the search input.

Example 11. A system according to any of the previous examples, wherein positions in the array of values that do not comprise a term identifier are each set with a predetermined value indicating that there is no relevant term identifier for that position.

Example 12. A system according to any of the previous examples, wherein setting the value at the position of each term identifier in the document to the distance score for each term identifier comprises inserting the distance score for each term identifier in the array at the position of the term in the document.

Example 13. A system according to any of the previous examples, wherein before calculating the snippet frame quality scores for each frame of the plurality of frames in the rank vector, the computing system determines a snippet frame size to use for calculating the snippet frame quality scores.

Example 14. A system according to any of the previous examples, wherein calculating the snippet frame quality scores for each frame of the plurality of frames in the rank vector comprises:

starting at a beginning first position of the array and determining a first frame of a size equal to the snippet frame size;

calculating a snippet frame quality score for the first frame using the values in the first frame;

moving to the next consecutive position in the array;

determining a next frame of a size equal to the snippet frame size; calculating a snippet frame quality score for the next frame using the values in the next frame;

continuing to move to a next consecutive position in the array; and calculating a snippet frame quality score for each frame until the end of the array is reached.

Example 15. A system according to any of the previous examples, wherein based on determining that the length of the character string associated with the highest ranked frame is larger than the requested length for a snippet, adjusting the size of the character string to be similar to the requested length for the snippet comprises removing unnecessary terms at the beginning and end of the character string.

Example 16. A system according to any of the previous examples, wherein based on determining that the length of the character string associated with the highest ranked frame is larger than the requested length for a snippet, adjusting the size of the character string to be similar to the requested length for the snippet comprises:

decreasing the snippet frame size and recalculating the snippet frame quality scores for each frame of a plurality of frames in the rank vector until a length of a character string associated with the highest ranked frame is similar to the requested length for the snippet.

Example 17. A system according to any of the previous examples, wherein based on determining that the length of the character string associated with the highest ranked frame is smaller than the requested length for a snippet, adjusting the size of the character string to be similar to the requested length for the snippet comprises:

increasing the size of the character string by adding one or more next ranked frame to the snippet until a length of a character string associated with the highest ranked frame and the one or more next ranked frames is similar to the requested length for the snippet Example 18. A system according to any of the previous examples, wherein based on determining that the length of the character string associated with the highest ranked frame is smaller than the requested length for a snippet, adjusting the size of the character string to be similar to the requested length for the snippet comprises:

increasing the snippet frame size and recalculating the snippet frame quality scores for each frame of a plurality of frames in the rank vector until a length of a character string associated with the highest ranked frame is similar to the requested length for the snippet.

Example 19. A non-transitory computer-readable medium comprising instructions stored thereon that are executable by at least one processor to cause a computing device to perform operations comprising:

accessing a document result for a search input, the document result comprising a list of term identifiers associated with a document for each term in the search input, a distance score for each term identifier, and one or more positions in the document for each term identifier;

generating a rank vector comprising an array of values for each term position of the document and setting a value at a position of each term identifier in the document to the distance score for each term identifier;

calculating snippet frame quality scores for each frame of a plurality of frames in the rank vector, each frame comprising a predetermined number of consecutive positions in the rank vector corresponding to a snippet frame size;

ranking the plurality of frames in the rank vector by the snippet frame quality scores;

determining a length of a character string associated with the highest ranked frame;

determining whether the length of the character string associated with the highest ranked frame is similar to a requested length for a snippet;

based on determining that the length of the character string associated with the highest ranked frame is larger than the requested length for a snippet, adjusting the size of the character string to be similar to the requested length for the snippet;

based on determining that the length of the character string associated with the highest ranked frame is smaller than the requested length for a snippet, adjusting the size of the character string to be similar to the requested length for the snippet; and based on determining that the length of a character string for one or more frames is similar to the requested length for the snippet, generating the character string to be provided in a result of a search for the search input.

Example 20. A non-transitory computer-readable medium according to any of the previous examples, wherein calculating the snippet frame quality scores for each frame of the plurality of frames in the rank vector comprises:

starting at a beginning first position of the array and determining a first frame of a size equal to the snippet frame size;

calculating a snippet frame quality score for the first frame using the values in the first frame;

moving to the next consecutive position in the array;

determining a next frame of a size equal to the snippet frame size;

calculating a snippet frame quality score for the next frame using the values in the next frame;

continuing to move to a next consecutive position in the array; and calculating a snippet frame quality score for each frame until the end of the array is reached.

Figure 5:
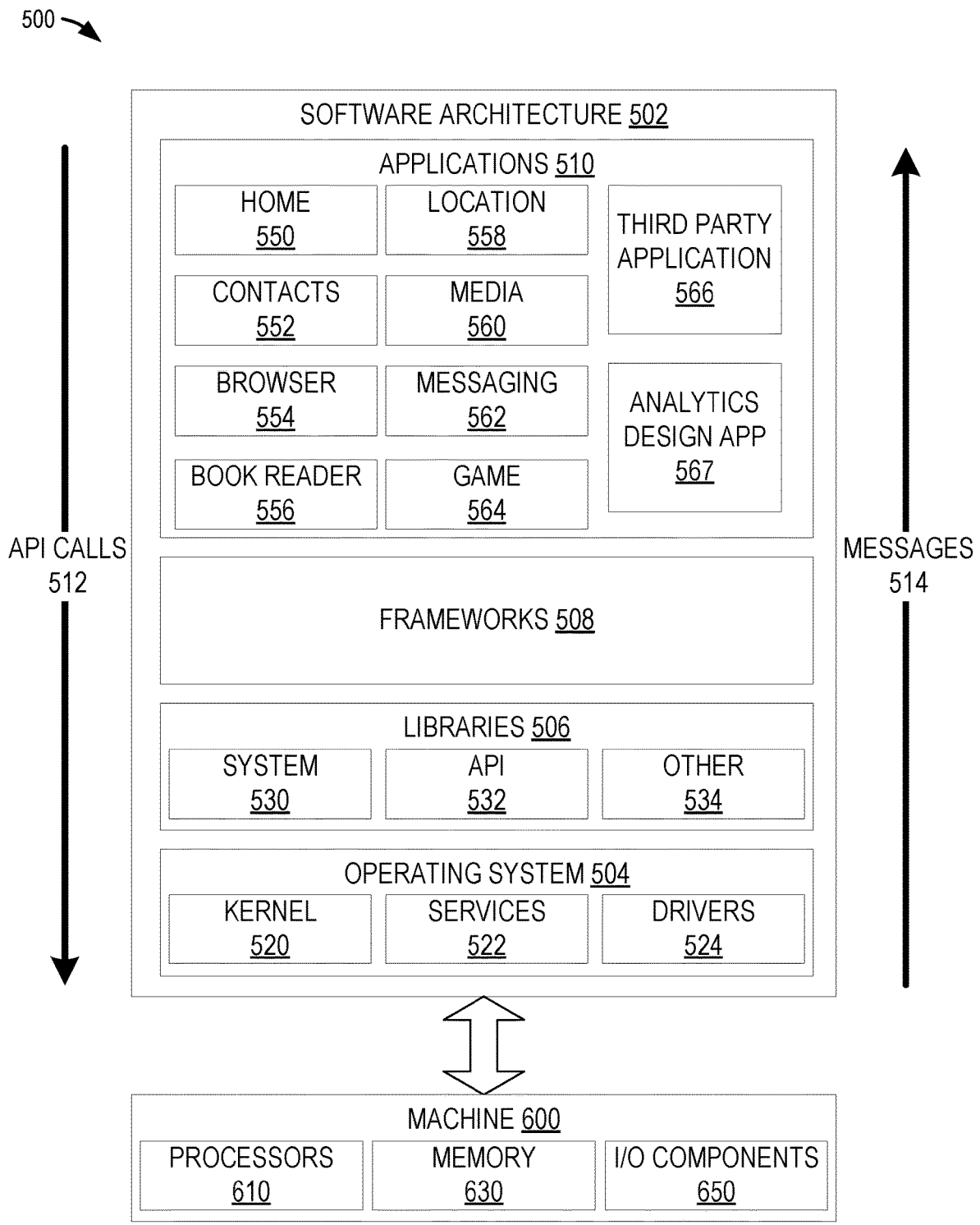
FIG. 5 is a block diagram illustrating an example of a software architecture that may be installed on a machine, according to some example embodiments.

FIG. 5 is a block diagram 500 illustrating software architecture 502, which can be installed on any one or more of the devices described above. For example, in various embodiments, client devices 110 and servers and systems 130, 102, 120, 122, and 124 may be implemented using some or all of the elements of software architecture 502. FIG. 5 is merely a non-limiting example of a software architecture, and it will be appreciated that many other architectures can be implemented to facilitate the functionality described herein. In various embodiments, the software architecture 502 is implemented by hardware such as machine 600 of FIG. 6 that includes processors 610, memory 630, and I/O components 650. In this example, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphic user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Some embodiments may particularly include analytics design application 567. In certain embodiments, this may be a stand-alone application that operates to manage communications with a server system such as third-party servers 130 or server system 102. In other embodiments, this functionality may be integrated with another application.

The analytics design application 567 may request and display various data related to designing and viewing analytics and may provide the capability for a user 106 to input data related to the objects via a touch interface, keyboard, or using a camera device of machine 1300, communication with a server system via I/O components 1350, and receipt and storage of object data in memory 1330. Presentation of information and user inputs associated with the information may be managed by analytics design application 567 using different frameworks 508, library 506 elements, or operating system 504 elements operating on a machine 1300.

Figure 6:
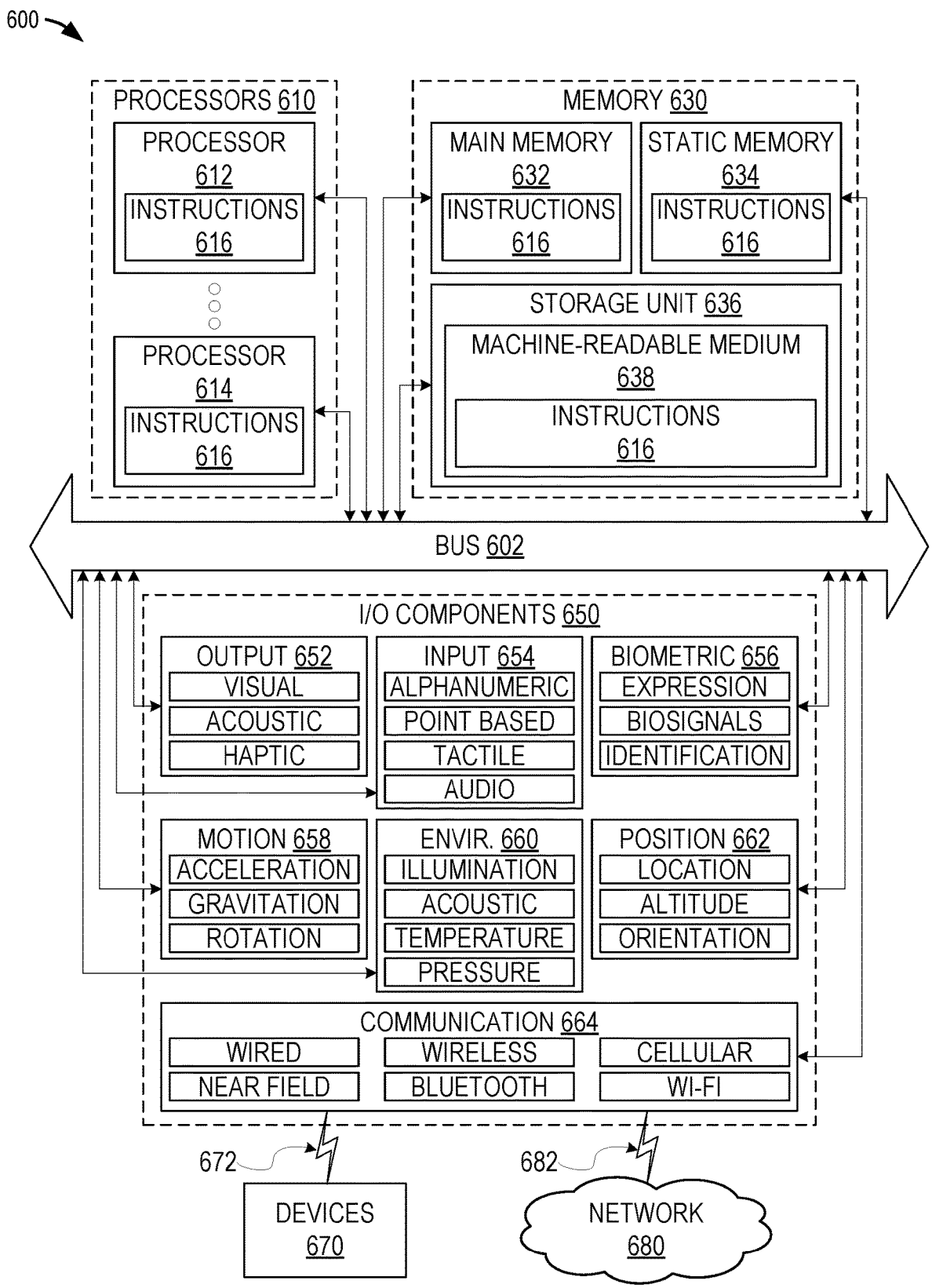
FIG. 6 illustrates a diagrammatic representation of a machine, in the form of a computer system, within which a set of instructions may be executed for causing the machine to perform any one or more of the methodologies discussed herein, according to an example embodiment.

FIG. 6 is a block diagram illustrating components of a machine 600, according to some embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application 510, an applet, an app, or other executable code) for causing the machine 600 to perform any one or more of the methodologies discussed herein can be executed. In alternative embodiments, the machine 600 operates as a standalone device or can be coupled (e.g., networked) to other machines. In a networked deployment, the machine 600 may operate in the capacity of a server machine 130, 102, 120, 122, 124, etc., or a client device 110 in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various embodiments, the machine 600 comprises processors 610, memory 630, and I/O components 650, which can be configured to communicate with each other via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute instructions 616 contemporaneously. Although FIG. 6 shows multiple processors 610, the machine 600 may include a single processor 610 with a single core, a single processor 610 with multiple cores (e.g., a multi-core processor 610), multiple processors 612, 614 with a single core, multiple processors 612, 614 with multiples cores, or any combination thereof.

The memory 630 comprises a main memory 632, a static memory 634, and a storage unit 636 accessible to the processors 610 via the bus 602, according to some embodiments. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various embodiments, the main memory 632, the static memory 634, and the processors 610 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example embodiment, to be a single medium, the term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 650 include biometric components 656, motion components 658, environmental components 660, or position components 662, among a wide array of other components. For example, the biometric components 656 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 include acceleration sensor components (e.g., accelerometer), gravitation sensor components, rotation sensor components (e.g., gyroscope), and so forth. The environmental components 660 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 662 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or another suitable device to interface with the network 680. In further examples, communication components 664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine 600 or any of a wide variety of peripheral devices (e.g., a peripheral device coupled via a Universal Serial Bus (USB)).

Moreover, in some embodiments, the communication components 664 detect identifiers or include components operable to detect identifiers. For example, the communication components 664 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 664, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 616 are transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, in other example embodiments, the instructions 616 are transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Furthermore, the machine-readable medium 638 is non-transitory (in other words, not having any transitory signals) in that it does not embody a propagating signal. However, labeling the machine-readable medium 638 "non-transitory" should not be construed to mean that the medium is incapable of movement; the medium 638 should be considered as being transportable from one physical location to another. Additionally, since the machine-readable medium 638 is tangible, the medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    generating, by a computing system, a rank vector comprising an array of values, each value associated with each term in a resultant document from a search input in an order the term appears in the resultant document;
    inserting, into the rank vector, a distance score at a position in the rank vector where the associated term appears in the resultant document;
    calculating, using the distance score for each term in a frame, frame quality scores for each frame of a plurality of frames in the rank vector, each frame comprising a number of consecutive terms in the rank vector;
    determining that a length of a character string associated with a frame with a highest frame quality score is not within a predetermined threshold of a requested length;
    adjusting a size of the character string to be within the predetermined threshold of the requested length; and
    generating an updated character string based on the adjusted size of the character string to provide in a result of a search for the search input.

2. The computer-implemented method of claim 1, wherein positions in the array of values that do not comprise a term associated with the search input are each set with a predetermined value indicating that there is no term associated with the search input for that position.

3. The computer-implemented method of claim 1, wherein before calculating the frame quality scores for each frame of the plurality of frames in the rank vector, the computing system determines a predetermined frame size to use for calculating the frame quality scores.

4. The computer-implemented method of claim 3, wherein calculating the frame quality scores for each frame of the plurality of frames in the rank vector comprises:
    starting at a beginning first position of the array and determining a first frame of a size equal to the predetermined frame size;
    calculating a frame quality score for the first frame using the values in the first frame;
    moving to a next consecutive position in the array;
    determining a next frame of a size equal to the predetermined frame size;
    calculating a frame quality score for the next frame using the values in the next frame;
    continuing to move to a next consecutive position in the array; and
    calculating a frame quality score for each frame until an end of the array is reached.

5. The computer-implemented method of claim 1, wherein adjusting the size of the character string to be within the predetermined threshold of the requested length comprises:
    recalculating the frame quality scores for each frame of a plurality of frames in the rank vector until a length of a character string associated with a highest ranked frame is within a predetermined threshold of the requested length or removing unnecessary terms at a beginning and an end of the character string.

6. The computer-implemented method of claim 1, wherein adjusting the size of the character string to be within the predetermined threshold of the requested length comprises:
    increasing the size of the character string by adding one or more next ranked frame to the character string until a length of the character string is within the predetermined threshold of the requested length.

7. The computer-implemented method of claim 1, wherein adjusting the size of the character string to be within the predetermined threshold of the requested length comprises:
    recalculating the frame quality scores for each frame of a plurality of frames in the rank vector until a length of a character string associated with a highest ranked frame is within a predetermined threshold of the requested length.

8. A system comprising:
    a memory that stores instructions; and
    one or more processors configured by the instructions to perform operations comprising:
    generating a rank vector comprising an array of values, each value associated with each term in a resultant document from a search input in an order the term appears in the resultant document;
    inserting, into the rank vector, a distance score at a position in the rank vector where the associated term appears in the resultant document;
    calculating, using the distance score for each term in a frame, frame quality scores for each frame of a plurality of frames in the rank vector, each frame comprising a number of consecutive terms in the rank vector;

determining that a length of a character string associated with a frame with a highest frame quality score is not within a predetermined threshold of a requested length;

adjusting a size of the character string to be within the predetermined threshold of the requested length; and generating an updated character string based on the adjusted size of the character string to provide in a result of a search for the search input.

9. The system of claim 8, wherein positions in the array of values that do not comprise a term associated with the search input are each set with a predetermined value indicating that there is no term associated with the search input for that position.

10. The system of claim 8, wherein before calculating the frame quality scores for each frame of the plurality of frames in the rank vector, a predetermined frame size is determined to use for calculating the frame quality scores.

11. The system of claim 10, wherein calculating the frame quality scores for each frame of the plurality of frames in the rank vector comprises:

starting at a beginning first position of the array and determining a first frame of a size equal to the predetermined frame size;

calculating a frame quality score for the first frame using the values in the first frame;

moving to a next consecutive position in the array;

determining a next frame of a size equal to the predetermined frame size;

calculating a frame quality score for the next frame using the values in the next frame;

continuing to move to a next consecutive position in the array; and calculating a frame quality score for each frame until an end of the array is reached.

12. The system of claim 8, wherein adjusting the size of the character string to be within the predetermined threshold of the requested length comprises:

recalculating the frame quality scores for each frame of a plurality of frames in the rank vector until a length of a character string associated with a highest ranked frame is within a predetermined threshold of the requested length or removing unnecessary terms at a beginning and an end of the character string.

13. The system of claim 8, wherein adjusting the size of the character string to be within the predetermined threshold of the requested length comprises:

increasing the size of the character string by adding one or more next ranked frame to the character string until a length of the character string is within the predetermined threshold of the requested length.

14. The system of claim 8, wherein adjusting the size of the character string to be within the predetermined threshold of the requested length comprises:

recalculating the frame quality scores for each frame of a plurality of frames in the rank vector until a length of a character string associated with a highest ranked frame is within a predetermined threshold of the requested length.

15. A non-transitory computer-readable medium comprising instructions stored thereon that are executable by at least one processor to cause a computing device to perform operations comprising:

generating a rank vector comprising an array of values, each value associated with each term in a resultant document from a search input in an order the term appears in the resultant document;

inserting, into the rank vector, a distance score at a position in the rank vector where the associated term appears in the resultant document;

calculating, using the distance score for each term in a frame, frame quality scores for each frame of a plurality of frames in the rank vector, each frame comprising a number of consecutive terms in the rank vector;

determining that a length of a character string associated with a frame with a highest frame quality score is not within a predetermined threshold of a requested length;

adjusting a size of the character string to be within the predetermined threshold of the requested length; and generating an updated character string based on the adjusted size of the character string to provide in a result of a search for the search input.

16. The non-transitory computer-readable medium of claim 15, wherein adjusting the size of the character string to be within the predetermined threshold of the requested length comprises:

recalculating the frame quality scores for each frame of a plurality of frames in the rank vector until a length of a character string associated with a highest ranked frame is similar to the requested length or increasing the size of the character string by adding one or more next ranked frame to the character string until the length of the character string is within the predetermined threshold of the requested length.

17. The non-transitory computer-readable medium of claim 15, wherein calculating the frame quality scores for each frame of the plurality of frames in the rank vector comprises:

starting at a beginning first position of the array and determining a first frame of a size equal to a predetermined frame size;

calculating a frame quality score for the first frame using the values in the first frame;

moving to a next consecutive position in the array;

determining a next frame of a size equal to the predetermined frame size;

calculating a frame quality score for the next frame using the values in the next frame;

continuing to move to a next consecutive position in the array; and calculating a frame quality score for each frame until an end of the array is reached.

* * * * *